United States Patent [19]

Birkestrand

[11] Patent Number: 5,069,094
[45] Date of Patent: Dec. 3, 1991

[54] TUBE END FINISHING MACHINE

[76] Inventor: Orville J. Birkestrand, 2705 Lee Ave., El Monte, Calif. 91773

[21] Appl. No.: 93,591

[22] Filed: Sep. 8, 1987

[51] Int. Cl.⁵ .............................................. B25B 13/06
[52] U.S. Cl. ...................................... 82/121; 82/120; 82/117
[58] Field of Search ............... 82/2 R, 4 C, 6 R, 2 E, 82/4 R, 34 A, 38 R, 21 R, 21 A, 44; 51/165.9

[56] References Cited
U.S. PATENT DOCUMENTS

| | | | |
|---|---|---|---|
| 4,365,528 | 12/1982 | Astle | 82/4 C |
| 4,449,871 | 5/1984 | Hillestad | 82/4 C |
| 4,532,837 | 8/1985 | Cushenbery et al. | 82/4 C |
| 4,534,134 | 8/1985 | Consay et al. | 51/165.9 |
| 4,594,873 | 6/1986 | Kaunitz | 82/4 C |
| 4,601,222 | 7/1986 | Gill | 82/4 C |

Primary Examiner—D. S. Meislin
Assistant Examiner—Lawrence Cruz
Attorney, Agent, or Firm—Wagner & Middlebrook

[57] ABSTRACT

A machine for finishing opposite ends of tubular metal stock secures the workpiece in position for machining by means of an expansible collet assembly inserted into the open end of the workpiece and expanded to grip the workpiece while the it is held against a stock stop. Expansion of the collet assembly, machining of the tube end, withdrawal of the machining tools and release of the workpiece from the collet assembly takes place in a controlled sequence.

13 Claims, 3 Drawing Sheets

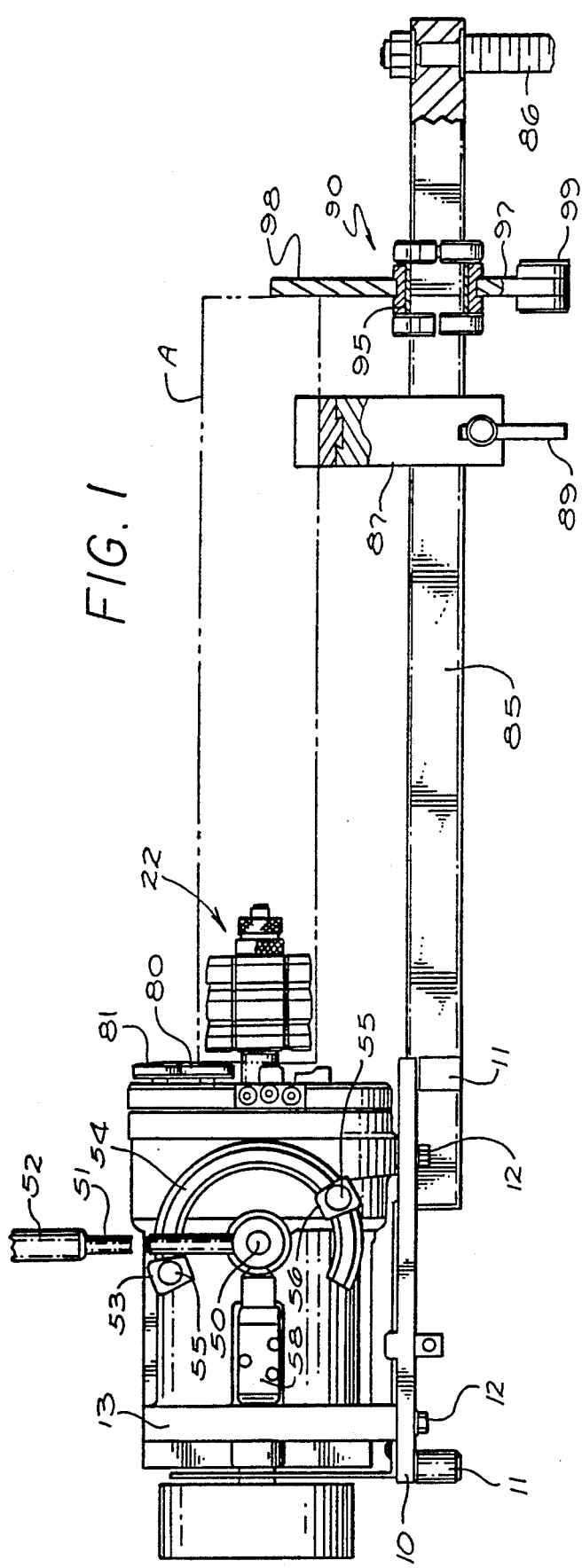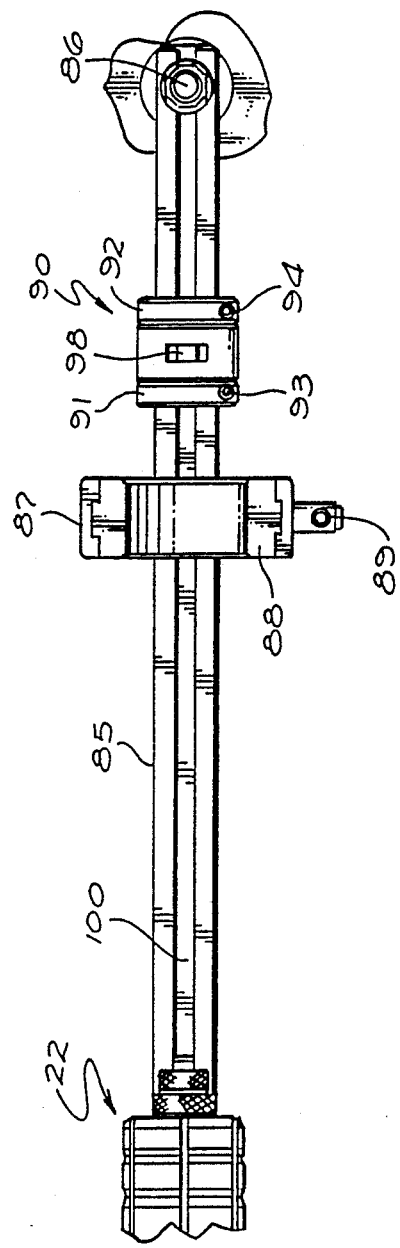

TUBE END FINISHING MACHINE

BACKGROUND OF THE INVENTION

1. Field of the Invention

The present invention relates to metal working machinery and more particularly to machines for finishing the ends of metal tubing to precise dimensions and with any desired internal and/or external beveling. The preferred embodiment of the invention is a machine designed for quantity production of finished tubing, but many of its features will be found adaptable to portable tube finishing machines.

2. The Prior Art

Machines designed for the purposes of the present invention have employed various kinds of devices for holding a workpiece in a fixed relation with respect to metal working tools for shaping and finishing tube ends. The work holding devices employed have included both conventional chucks and other arrangements for gripping the exterior surfaces of workpieces. Examples of such devices are found in the Strout U.S. Pat. No. 3,228,268 and Saine U.S. Pat. No. 4,319,503.

When it is required in tube finishing that close dimensional tolerances be maintained, and especially where rates of production are important, such devices have not proved satisfactory, principally because of the difficulty of closing such chucks or the like without allowing some movement of the workpiece or, in the case of relatively thin-walled tubing, distorting the stock out of round.

SUMMARY OF THE INVENTION

The tube finishing machine of the present invention meets the objections described above by providing a machine in which the tubular workpiece is held in position during finishing by means inserted into the interior of the workpiece a sufficient distance to permit the desired finishing operations without interference between the holding means and the metal working tools. This arrangement makes it possible to automatically chuck and center over or undersized work pieces and to avoid distortion of thin walled stock out of round. Also, this makes it possible to maintain close tolerances in the product by abutting the rough cut tubes to be finished against a stock stop means accurately positioned adjacent the metal working tool. Optionally a second stock stop means selectively positionable along a rail extending from the housing carrying the metal working tool may be employed. The insertion and removal of workpieces in the machine is expedited by providing means for expanding the workholding means and advancing the tool into engagement with the workpiece in proper sequence and by providing for rapid release of the workpiece at the conclusion of each finishing operation.

BRIEF DESCRIPTION OF THE DRAWING

FIG. 1 is a view in side elevation of a tube finishing machine embodying the present invention, with a workpiece shown in phantom in position for finishing.

FIG. 2 is a view in plan of a portion of the machine of FIG. 1 showing details of the workpiece positioning means.

DETAILED DESCRIPTION OF THE PREFERRED EMBODIMENT

Figure 3:
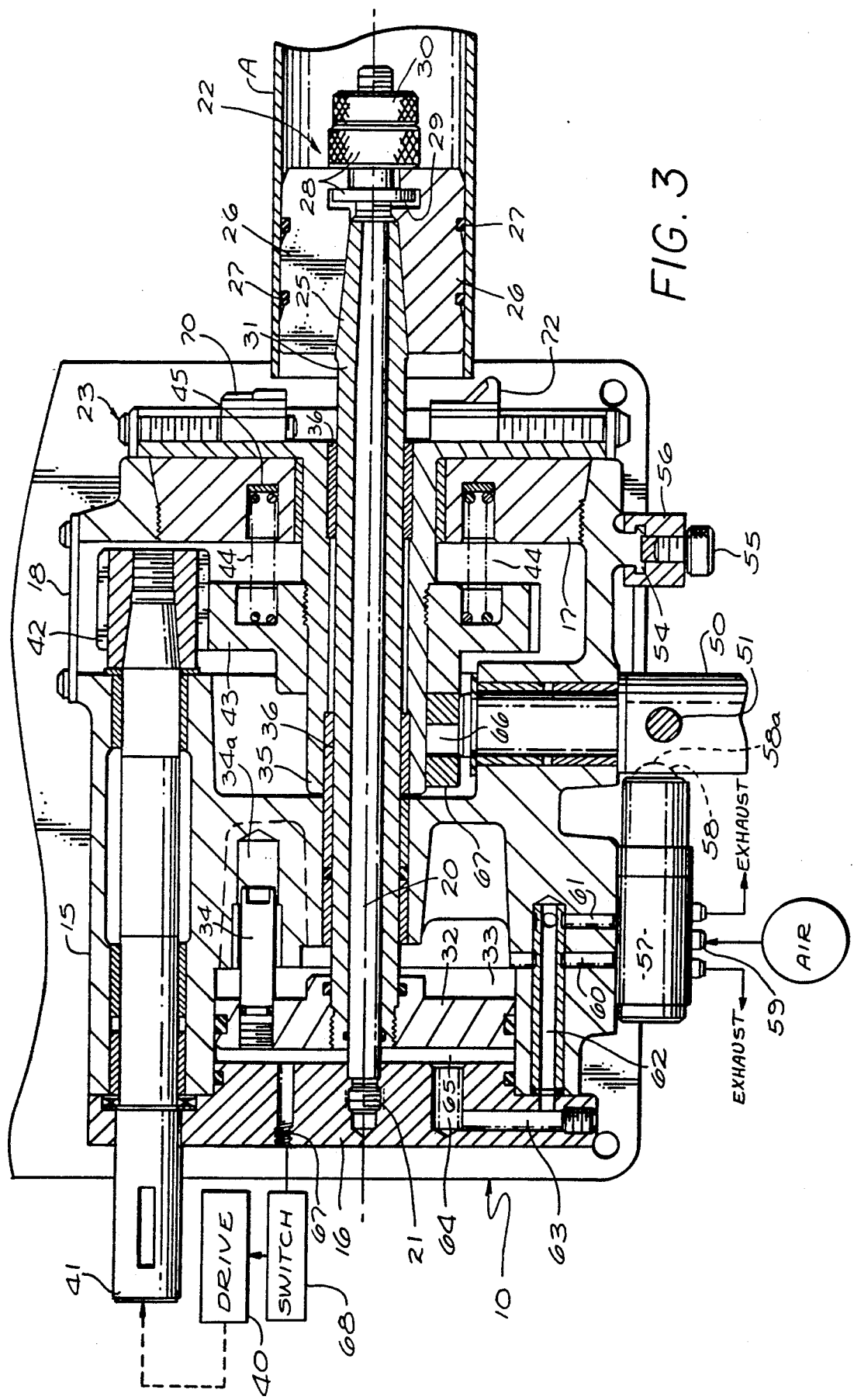
FIG. 3 is a view in plan, partially in section, showing the interior of the housing and the positioning of a workpiece in relation to the metal working tooling.
Figure 4:
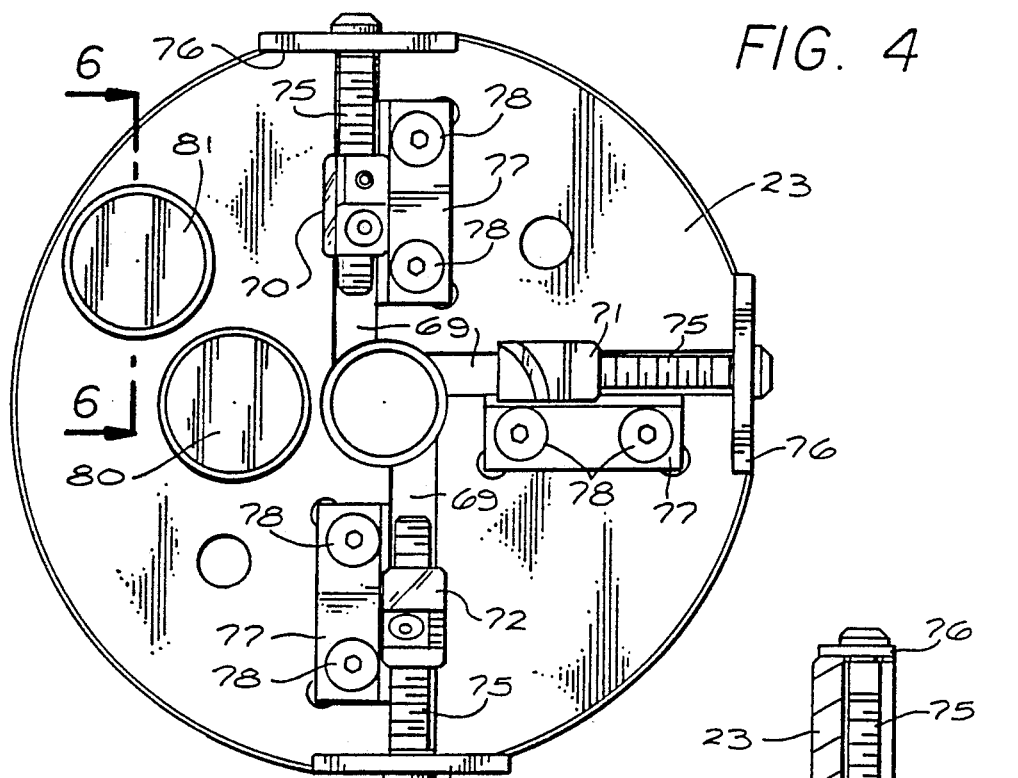
FIG. 4 is detail view in front elevation of the rotatable face plate carrying the metalworking tooling and stock stops.
Figure 5:
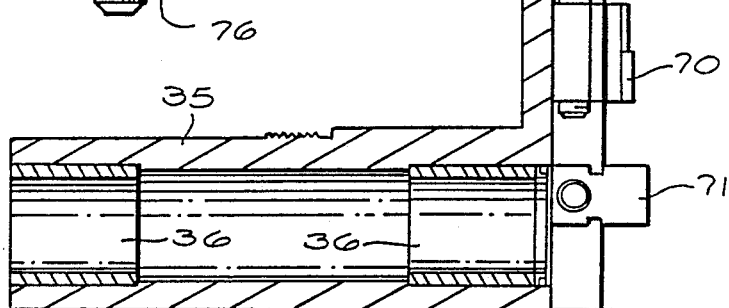
FIG. 5 is a view in side elevation and partly in section of the face plate of FIG. 4.

The preferred embodiment of the tube finishing machine of the present invention, as shown in the accompanying drawings, has a base 10 (FIG. 1) supported by feet 11. Secured to the base 10, as by bolts 12, is a housing 15 closed at one end by a rear cover plate 16, at its opposite end by a front bearing plate 17, and at its side by a cover plate 18.

Means, including a draw bar 20 fixed at its rear end 21 to the rear cover plate 16, are provided for supporting an expansible collet assembly 22 in spaced relation to the front bearing plate 17, and a rotatably mounted face plate 23, in the space between the collet assembly 22 and the front bearing plate 17.

The collet assembly 22 (FIGS. 1, 2 and 3) comprises a frusto-conical taper arbor 25, axially slidable on the frontal portion of the draw bar 20; an assembly of, for example, six collet segments 26 presenting a cylindrical exterior and a interior cavity matching the taper of the arbor 25; and elastic O-rings encircling the segments 26 in grooves which serve to retain them in position.

The segments 26 are precisely restrained against endwise movement with respect to the draw bar 20, while remaining free to move radially, by a flanged collar 28 having a knurled head which is threaded on the front end portion of draw bar 20. This collar extends part way into notches 29 in segments 26, and a lock nut 30 threaded on the draw bar 20 is settable to limit forward movement of the collect assembly. This arrangement is such that forward movement of the taper arbor 25, toward collar 28, will cause outward radial movement of segments 26 to engage and grip the interior surface of a tubular workpiece A as shown in FIG. 3 and, when opposite movement of arbor 25 occurs, elastic O-rings will cause radial inward movement of the segments to release the workpiece. This arrangement allows free radial movement of the segments 26 to grip or release the stock while allowing minimal radial movement.

Pneumatic means are provided for expanding the collect assembly into gripping relationship with a workpiece and permitting its contraction to release the workpiece. For this purpose a sleeve 31 axially slidable on draw bar 20 is formed integrally with taper arbor 25 and carries at its rear end an air piston 32 which is reciprocable within a cylindrical cavity 33 in housing 15. The air piston 34 is constrained against rotational movement by pins 34 fixed in the piston 32 radially outwardly of its center and extending into cavities 34a in the housing 15.

The face plate 23 which, as will be described in more detail herinafter, carries metal working tools for finishing the ends of the workpiece A, is mounted for both rotational and axial movement with respect to draw bar 20. For this purpose the face plate 23 has formed integrally therewith a hub 35 which is both rotatable on and axially slidable with respect to sleeve 31 on oilite bearings 36 disposed between it and the sleeve.

Rotation of the face plate 23 is effected by a conventional electric motor diagrammatically indicated at 40 connected to a drive shaft 41 journalled in the housing 15 which carries at its forward end an input pinion 42 which is of sufficient width to mesh in axially displaced positions with a narrower drive gear 43 which is secured to the hub 35 of face plate 23 and therefore axially movable therewith. The drive gear 43 is urged toward its rearward position by spring means comprising compression springs 44 seated in recesses in gear 43 and in the front bearing plate 17 respectively; a bearing 45 being interposed between the spring means and the front bearing plate with respect to which the spring means is rotatable.

Means are provided for actuating sequentially, the mechanism for expanding the collet assembly into gripping relationship with a workpiece, and advancing the face plate to engage its tooling with the workpiece. For this purpose there is journalled in the housing 15 an actuating shaft 50 having a radial extension 51 (see also FIG. 1) provided at its upper end with a feed handle 52 to facilitate manual oscillation of shaft 50. Oscillatory movement of the feed handle 52 is limited by a pair of stop clamps 53 and 56 (see also FIG. 3) settable at any desired positions along an arcuate segment 54 integral with housing 15 and capable of being secured in position by lock screws 55.

Means are provided for actuating the mechanism for expanding the collect assembly into gripping engagement with a workpiece upon initiation of clockwise movement of the actuating shaft 50 from the position in which it is shown in the drawings. For this purpose there is secured to the housing 15 adjacent the shaft 50 a two-position air valve 57 of conventional construction such as the Model KSC-4212 manufactured by Versa Products Co., Inc of Paramus, N.J., which when its core 58 is is its normal position into which it is spring biased, admits air under pressure from a source connected at 59 into a passage 60 in the side wall of housing 15 and thence into the cavity 33 on the forward side of the piston 32, thus maintaining the piston 32, sleeve 31 and taper arbor 25 in their rearward, retracted positions permitting the collect assembly to be retracted out of engagement with a workpiece.

When the core 58 of the air valve 57 is moved into its second position, air is exhausted through the passage 60 and air under pressure from the source is admitted to a passage 61 and thence via passages 62, 63 (which is closed at its outer end by a plug) and 64 to the portion 65 of cavity 33 at the rear, or leftward, side of the piston 32. This effects forward movement of the piston and sleeve 31, expanding the collet assembly into gripping relationship with the interior of a workpiece. As air pressure builds up in the cavity following forward movement of the piston 32, air exiting through passage 67 actuates a conventional pressure operated electrical switch 68, which may be, for example, a reverse action switch manufactured by Furnas Electric Co. of Batavia, IL identified as Series B-715 69WR5. This starts the motor 40 and initiates rotation of face plate 23. Thereafter, when the core of the air valve 57 is returned to its first position, air is exhausted through passages 67, 64, 63, 62 and 61 and air under pressure from the source is admitted through passage 60, causing retraction of the piston 32 to its rearward position and opening of the motor switch 68.

The forward end of the core 58 of air valve 57 extends into a circular depression 58a in the side of the actuating shaft 50 so that upon the first clockwise movement of the shaft, the core 58 is cammed into its second position, causing the collet assembly to expand into gripping relationship with a workpiece.

The inner end of the actuating shaft 50 terminates in a pin 66 which is eccentric with repect to the axis of the shaft. This pin extends into the inner race of a ball bearing 67 the outer race of which bears against the hub of gear 43 which is secured to the hub of face plate 23 so that upon clockwise movement of the shaft 50, the face plate 23 is moved forwardly to bring the tooling carried by it against the end of the workpiece after the workpiece has been gripped by the expanded collet assembly.

As shown in FIGS. 3, 4, 5 and 6; the face plate 23 provides a base upon which a plurality of metal working tools may be adjustably mounted and brought into engagement with the end of a workpiece to finish it precisely to a desired length; to bevel its exterior margin; to bevel its interior margin; or for other purposes. A plurality of such operations can be performed simultaneously.

For this purpose the face plate 23 is provided with a plurality of slots 69 into which the base portions of tool blocks 70, 71 and 72 are fitted for sliding movement radially of the face plate. Adjustment of the tools along the slots is effected by rotation of feed screws 75 keyed to ears 76 on the face plate for rotation therein and mating with complementary threads in the tool blocks 70, 71 and 72. Following adjustment of the tool blocks, they are firmly retained in adjusted positions by locking blocks 77 held against the tool blocks by screws 78.

Figure 6:
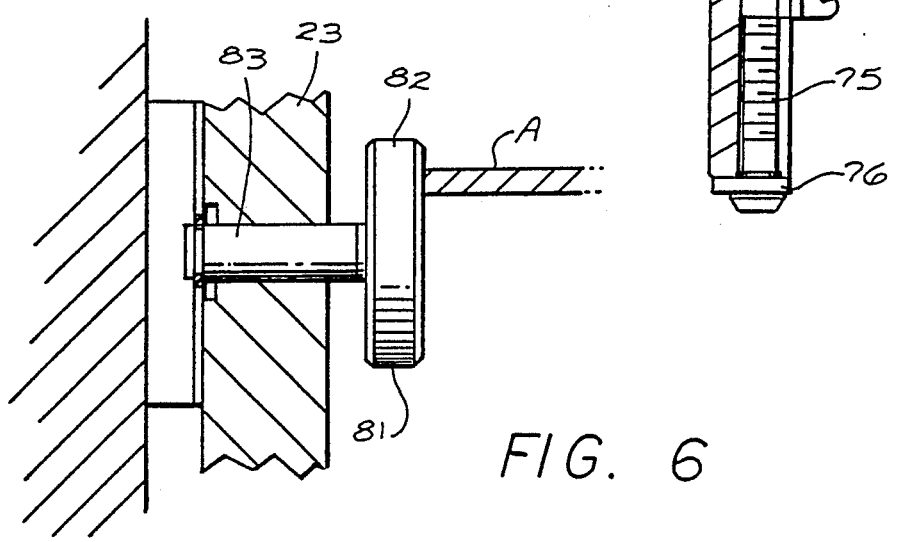
FIG. 6 is a detail view in side elevation of one of the stock stops showing the manner in which it is mounted on the face plate and the manner in which it engages a workpiece.

Radially spaced with respect to the center of face plate 23 are stock stops 80 and 81, shown in detail in FIG. 6, each of which comprises a head portion 82 and a shank portion 83 which fits and is slidable within a passage in the face plate 23 and is secured in position by a resilient retainer fitting within a groove in the shank 83.

As shown in FIGS. 1 and 2, there is secured to the under side of base 10, a stop scale rail 85 supported at its opposite end by a threaded post 86 on which the rail is vertically adjustable for leveling. A stock rest 87 having a removable semi cylindrical concave upper portion 88 is mounted for endwise sliding movement along the rail 85 to provide intermediate support for a workpiece, and this rest may be clamped at any desired position along the rail by a vise type clamp actuated by a handle 89.

Also mounted for sliding movement along the rail 85 is a gravity finger stop assembly 90 comprising a pair of split ring clamps 91 and 92 the opposite portions of which are joined by screws 93 and 94 by means of which they may be secured at any desired position along the rail 85. A sleeve 95 disposed between the clamps 91 and 92 journals a gravity finger stop 97 comprising an upwardly extending finger stop 98 and a counterweight 99 on its depending portion.

This arrangement is such that the counterweight 99 normally maintains the finger 98 in a vertical attitude in which it extends into the path along which a workpiece is inserted over the collet. During such positioning of a workpiece, however, it may be manually moved aside from that path.

Optionally, a scale may be placed in a groove 100 along the upper face of rail 85 to facilitate the positioning of stop 97 in conformity with the desired dimensioning of the workpieces to be finished.

OPERATION

In employing the machine of the present invention to finish the ends of tubing, a collet assembly 22 of the appropriate diameter first is placed on the free end of draw bar 20, then a section of tubing cut to the approximate length desired is placed on the stock rest 87 and moved endwise over the collet assembly into contact with the face of one of the stock stops 80, 81 depending upon the diameter of the tubing; the finger 98 being manually moved aside for this purpose.

The handle 52 is then moved slowly clockwise. This results in first expanding the collect assembly 22 to grip the interior of the tubing and, sequentially thereafter, in moving the face plate 23 which is now being rotated by the motor, toward the clamped end of the tubing; the stock stop or stops 80, 81 in contact with the tubing remaining fixed in position as the face plate advances. As the face plate advances further, its cutting tools 70, 71 and 72 are brought into contact with the tubing's end and the desired finish, as observed by the operator, is thus applied to that end. The forward handle stop 56 is then moved to a position against the handle and set by tightening screw 55, and the handle is returned to its home position against the rear stop 53 to cause retraction of the face plate 23 and contraction of the collet assembly to release the tubing.

The tubing is then reversed end for end and its unfinished end is placed over the collet assembly and in engagement with the stock stop or stops. At this point, optionally, the gravity finger stop assembly may be clamped in a position on the rail 85 in which the finger 98 engages the already finished end of tubing. Again, the handle 51 is moved clockwise to first expand the collet assembly into gripping relationship with the inside of the tubing and then finish the previously unfinished end of the tubing; the forward stop 53 insuring against removal of excess material and exactly controlling the length of the finished workpiece. When this has been accomplished, the handle is again returned to its home position against the rearward stop 53, thus releasing the finished tubing.

While the foregoing description and drawings constitute a disclosure of the presently preferred embodiment of the invention, it is understood that modifications will occur to those skilled in the art to which the invention relates and that therefore the invention is not to be considered as limit except as required by the prior art and by the spirit of the appended claims.

I claim:
1. A tube finishing machine comprising
   a housing having coaxially mounted thereon a collet assembly spaced from said housing and expansible to grip the interior of a tubular workpiece,
   means rotatable on said common axis and axially movable within the space between said housing and said collet assembly for performing machining operations on a tube gripped by said collet assembly and
   a common control means including a single operation initiating device for sequentially initiating expansion of said collet assembly to cause the same to grip the interior of a tube placed over said assembly;
   axial movement of said means for performing machining operations; and
   rotation of said means for performing machining operations.

2. A tube finishing machine according to claim 1 in which said common control means includes pneumatic means comprising
   a double acting piston and cylinder means and
   means responsive to an increase in pressure on one side of said piston for initiating rotation of said means for performing machining operations.

3. A tube finishing machine according to claims 1 in which said means for performing machining operations includes
   stock stop means for limiting the axial movement toward said housing of tubing inserted over said collet assembly.

4. A tube finishing machine according to claim 3 in which said means for performing machining operations includes
   a rotatable face plate carrying metal working tooling, and
   said stock stop means comprises a member mounted in said face plate at a location radially diplaced from its axis and movable with respect thereto parallel to the axis of said face plate.

5. A tube finishing machine comprising
   a housing
   a draw bar having one end fixed in said housing and
   a portion extending outwardly from said housing,
   a sleeve on said draw bar axially movable with respect thereto,
   an expansible collet assembly mounted on the outwardly extending portion of said draw bar, and
   means responsive to axial movement of said sleeve on said draw bar for expanding and contracting said collet assambly.

6. A tube finishing machine according to claim 5 in which said collet assembly is removably mounted on said draw bar.

7. A tube finishing machine according to claim 5 including additionally
   pneumatic means for effecting axial movement of said sleeve with respect to said draw bar.

8. A tube finishing machine according to claim 7 in which said pneumatic means is effective to cause axial movement of said sleeve with respect to said draw bar in both directions.

9. A tube end finishing machine comprising
   a housing having coaxially mounted thereon a collet assembly spaced from said housing and expansible to grip the interior of a tubular workpiece, means rotatable on said axis and axially movable within the space between said housing and said collet assembly for performing machining operations on a tube gripped by said collet assembly, stock stop means for limiting the axial movement toward said housing of tubing inserted over said collet assembly, stock stop means for limiting the axial movement toward said housing of tubing inserted over said collet assembly, a stock rest rail extending outwardly from said housing parallel to said axis and including an adjustable stop extending across said axis, and
   means including a single operation-initiating device for sequentially initiating expansion of said collet assembly to cause the same to grip the interior of a tube placed over said assembly, axial movement toward said collet assembly of said means for performing machining operations, and rotation of said means for performing machining operations.

10. In a tube end finishing machine comprising a housing having coaxially mounted thereon a work holder assembly selectively operable to grip or release a tubular work piece and means including a spindle rotatable on said common axis and axially movable with respect to said work holder assembly for performing machining operations on the end of a tube gripped by said work holder, the improvement comprising means including a single manually operable lever for concurrently effecting actuation of said work holder to grip a work piece and axial movement of said means for performing machine operations into engagement with a work piece gripped by said work holder.

11. A tube end finishing machine according to claim 10 in which said lever also causes initiation of rotation of said means for performing machining operations.

12. A tube finishing machine according to claim 5 including additionally
  rotatable means coaxial with said draw bar and axially movable with respect thereto for performing machining operations on a tube gripped by said collet assembly and
  stock stop means for limiting axial movement toward said housing of tubing inserted over said collet assembly.

13. A tube finishing machine according to claim 12 in which
  said stock stop means is carried by said rotatable means.

* * * * *

UNITED STATES PATENT AND TRADEMARK OFFICE
CERTIFICATE OF CORRECTION

PATENT NO. : 5,069,094
DATED : Dec. 3, 1991
INVENTOR(S) : Orville J. Birkestrand It is certified that error appears in the above-identified patent and that said Letters Patent is hereby corrected as shown below:

Column 2, line 31, after "a" insert --tapering--.

Signed and Sealed this

Twenty-seventh Day of April, 1993

*Attest:*

MICHAEL K. KIRK

*Attesting Officer*     Acting Commissioner of Patents and Trademarks